(12) United States Patent
Parker

(10) Patent No.: US 8,366,191 B2
(45) Date of Patent: Feb. 5, 2013

(54) CENTER CHILD SAFETY RESTRAINT SYSTEM FOR TWO OCCUPANT REAR SEAT WITH CENTER CONSOLE

(75) Inventor: Grey B. Parker, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 206 days.

(21) Appl. No.: 12/948,421

(22) Filed: Nov. 17, 2010

(65) Prior Publication Data

US 2012/0119479 A1     May 17, 2012

(51) Int. Cl.
*B60N 2/26* (2006.01)
*B60N 3/10* (2006.01)

(52) U.S. Cl. ............... 297/250.1; 297/256.16; 296/37.8; 296/65.03

(58) Field of Classification Search ................... 297/144, 297/188.01, 188.14, 188.19, 238, 250.1, 297/253, 254, 256.14, 256.16, 464; 296/37.8, 296/65.03
See application file for complete search history.

(56) References Cited

U.S. PATENT DOCUMENTS

| | | | |
|---|---|---|---|
| 3,193,326 A | | 7/1965 | Smith |
| 4,756,573 A | | 7/1988 | Simin et al. |
| 5,106,153 A | * | 4/1992 | Durling .......................... 297/232 |
| 6,234,529 B1 | * | 5/2001 | Ellison et al. .................. 280/808 |
| 6,264,261 B1 | * | 7/2001 | Krafcik .......................... 296/37.8 |
| 6,435,587 B1 | * | 8/2002 | Flowerday et al. .......... 296/37.8 |
| 6,554,357 B2 | * | 4/2003 | Moffa ............................ 297/253 |
| 6,588,821 B2 | | 7/2003 | Worrell et al. |
| 6,601,917 B1 | | 8/2003 | Christopherson |
| 6,726,267 B2 | * | 4/2004 | Kim et al. ................... 296/24.34 |
| 6,869,141 B2 | * | 3/2005 | Yamaoka et al. ............. 297/253 |
| 7,341,297 B2 | * | 3/2008 | Nakamura et al. ......... 296/24.34 |
| 7,377,550 B2 | | 5/2008 | Lee |
| 7,677,656 B2 | | 3/2010 | Saberan et al. |
| 7,806,451 B2 | * | 10/2010 | Lota ............................ 296/24.34 |
| 8,033,588 B2 | * | 10/2011 | Luginbill et al. .......... 296/24.34 |
| 8,167,348 B2 | * | 5/2012 | Fesenmyer ................ 296/24.34 |
| 2002/0140246 A1 | * | 10/2002 | Worrell et al. ............... 296/37.8 |
| 2003/0209926 A1 | * | 11/2003 | Nakagawa et al. ...... 297/256.16 |
| 2009/0051155 A1 | | 2/2009 | Amano |
| 2009/0146444 A1 | * | 6/2009 | Ichimaru ..................... 296/37.8 |

\* cited by examiner

*Primary Examiner* — David Dunn
*Assistant Examiner* — Richard Lowry
(74) *Attorney, Agent, or Firm* — Rankin Hill & Clark LLP

(57) ABSTRACT

A vehicle rear seat assembly having a center child safety restraint system comprises a pair of outboard seats and a center console positioned between the outboard seats and stationary with respect to the outboard seats. The console includes a storage compartment disposed at a forward portion of the console and having an opening which allows an associated object to be selectively placed within the storage compartment. A pair of spaced apart recesses is disposed at a rear portion of the console. A first child safety restraint attachment is located within the storage compartment. A pair of second child safety restraint attachments is provided, each second attachment being located in one of the recesses. The first attachment and the pair of second attachments allow a child safety restraint to be selectively secured to the center console.

18 Claims, 10 Drawing Sheets

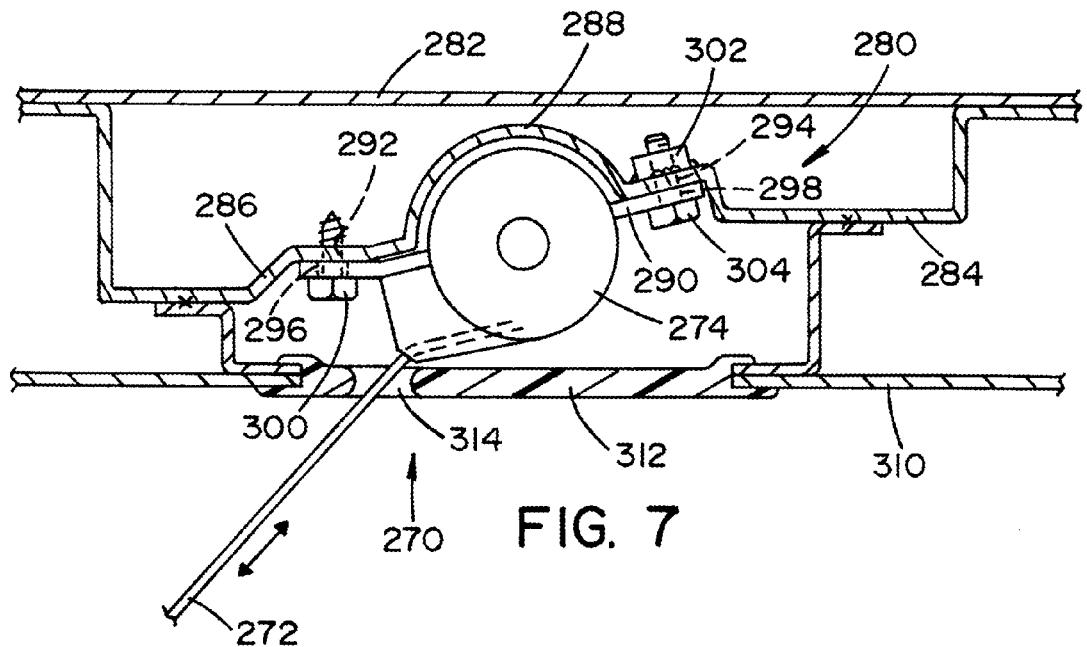
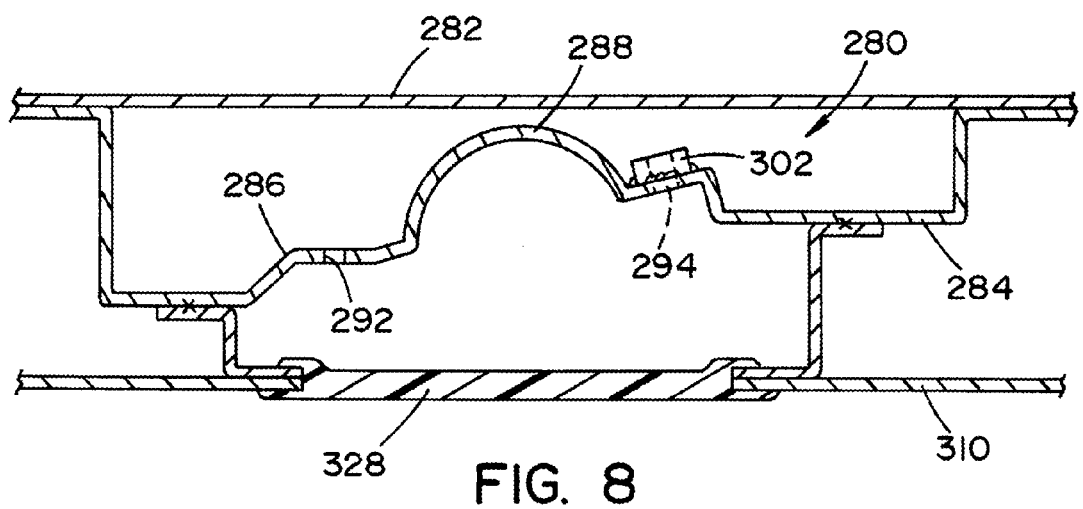

CENTER CHILD SAFETY RESTRAINT SYSTEM FOR TWO OCCUPANT REAR SEAT WITH CENTER CONSOLE

BACKGROUND

Exemplary embodiments herein generally relate to a vehicle rear seat assembly, and more particularly to a center child safety restraint system for a vehicle rear seat assembly for two outer occupants with a center console.

A known vehicle rear seat assembly includes a pair or outboard seats, each outboard seat being adjacent to one side of the vehicle. Each outboard seat has a seatback moveably or hingedly connected to a seat base or cushion. The seatback of each outboard seat is capable of movement between a stowed, folded position where the seatback is folded toward the seat base and an upright, seated position. The vehicle rear seat assembly can also include a stationary center console provided between the outboard seats. The center console is configured to removably contain and/or store items and/or goods which can be selectively utilized within the vehicle by the occupant. Typically, the center console occupies an area or region of the rear seat assembly which would normally be used as a passenger seat.

Young children are required to ride in/on child safety restraints (i.e., infant carriers/safety seats, child safety seats and booster seats) that are secured to a seat in the rear or second row of the vehicle. Airbags mounted in the dashboard and other interior locations make it inappropriate to have a child ride in the vehicle front seat. One problem with seating children in rear outboard seating areas is that it is difficult to reach and communicate with the child from the front row seats. Child safety restraints are often positioned in a rear outboard seat, which reduces seating available for adults. Placing a child safety restraint near the center of the vehicle provides the safest position in the vehicle in the event of a collision. However, because child seat attachment points are generally not included for a center console of a typical two occupant rear seat assembly due to console interference, placement of the child safety restraint near the center of the seat assembly is prevented.

BRIEF DESCRIPTION

In accordance with one aspect, a vehicle rear seat assembly having a center child safety restraint system comprises a pair of outboard seats and a center console positioned between the outboard seats and stationary with respect to the outboard seats. The console includes a storage compartment disposed at a forward portion of the console and having an opening which allows an associated object to be selectively placed within the storage compartment. A pair of spaced apart recesses is disposed at a rear portion of the console. A first child safety restraint attachment is located within the storage compartment. A pair of second child safety restraint attachments is provided, each second attachment being located in one of the recesses. The first attachment and the pair of second attachments allow a child safety restraint to be selectively secured to the center console.

In accordance with another aspect, a vehicle rear seat assembly having a center child safety restraint system comprises a pair of outboard seats and a center console assembly positioned between the outboard seats and stationary with respect to the outboard seats. Each of the outboard seats has a seatback and a seat base. The center console includes a first child safety restraint attachment located at a forward portion of the console and a pair of second child safety restraint attachments located at a rear portion of the console. The first attachment and the pair of second attachments allow a child safety restraint to be selectively secured to a top surface of the console. The console is configured to conceal the first attachment and the pair of second attachments in a non-use condition.

In accordance with yet another aspect, a vehicle rear seat assembly having a center child safety restraint system comprises a pair of outboard seats and a center console assembly positioned between the outboard seats and stationary with respect to the outboard seats. Each of the outboard seats has a seatback and a seat base, the seatback capable of pivoting between a stowed position where the seatback is folded toward the seat base and an upright, seat position. The center console includes an interior storage compartment located at a forward portion of the console and a pair of recesses located at a rear portion of the console. A first child safety restraint attachment is disposed within the storage compartment and a pair of second child safety restraint attachments is disposed within the pair of recesses. The first attachment and the pair of second attachments allow a child safety restraint to be selectively secured to the console. A seatbelt assembly for use with the child safety restraint has a seatbelt and a retractor for winding up the seatbelt. The retractor is mounted on a roof support structure of the vehicle. A roof lining of the vehicle includes a garnish for at least partially covering the roof mounted retractor.

BRIEF DESCRIPTION OF THE DRAWINGS

FIG. 7 is a cross-sectional view of the seatbelt assembly of FIG. 5 taken generally along line 7-7 of FIG. 5.

FIG. 8 is a cross-sectional view of the roof support structure of FIG. 6 taken generally along line 8-8 of FIG. 6.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary vehicle seat assembly disclosed herein are merely terms of art that may vary from one manufacturer to another and should not be deemed to limit the present disclosure.

Figure 1:
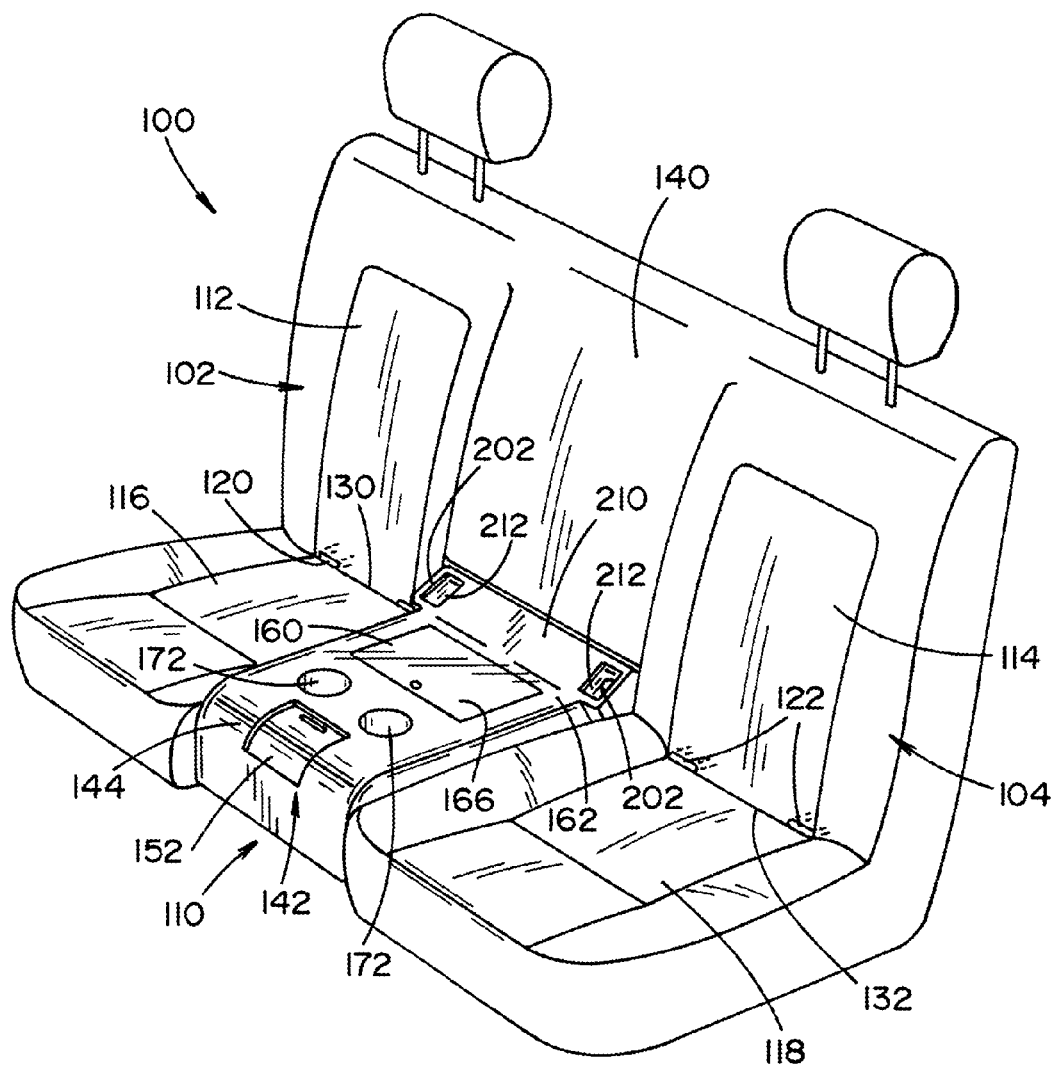
FIG. 1 is a schematic perspective view of a rear seat assembly for a vehicle having an exemplary child safety restraint system according to the present disclosure.

Referring now to the drawings, wherein like numerals refer to like parts throughout the several views, FIG. 1 schematically illustrates an exemplary rear seat assembly 100 for a vehicle having a child safety restraint system according to the present disclosure. The rear seat assembly 100 can be adapted for use in connection with a vehicle having an increased cargo and passenger-carrying capability. The depicted rear seat assembly 100 is generally used in vehicles having one or more side-mounted rear doors, in addition to the usual two front doors and possibly a tailgate member. As shown, the rear seat assembly 100 includes a pair of outboard seats 102, 104 and a stationary center console 110 according to one aspect of the present disclosure. Each outboard seat 102,104 includes a seatback 112,114 and a seat base or cushion 116,118 for supporting an occupant. Each seatback can be pivotally connected to the seat base, which is connected to a vehicle floor, via a pivoting mechanism (not shown). With a pivotal connection between the seatbacks and the seat bases, each seatback 112,114 is capable of moving between a stowed position where the seatback is folded toward each respective seat base 116,118 and an upright, seated position where each seatback 112,114 is generally perpendicular to each seat base. Each of the outboard seats 102,104 include a pair of lower anchorages or anchor bars 120,122. The anchor bars 120,122 are provided in or near a seat bight 130,132 of each respective outboard seat 102,104. As is known, the seat bights 130,132 are the intersection of the seatbacks 112,114 and bottom cushions 116,118, where vehicle belts typically emerge and where or near the lower anchor bars 120,122 are placed. The anchor bars 120,122 of the respective outboard seats 102,104 can be mounted to a common vehicle support component (not shown) which spans along a lateral direction of the vehicle between outboard sides of the outboard seats.

Figure 3:
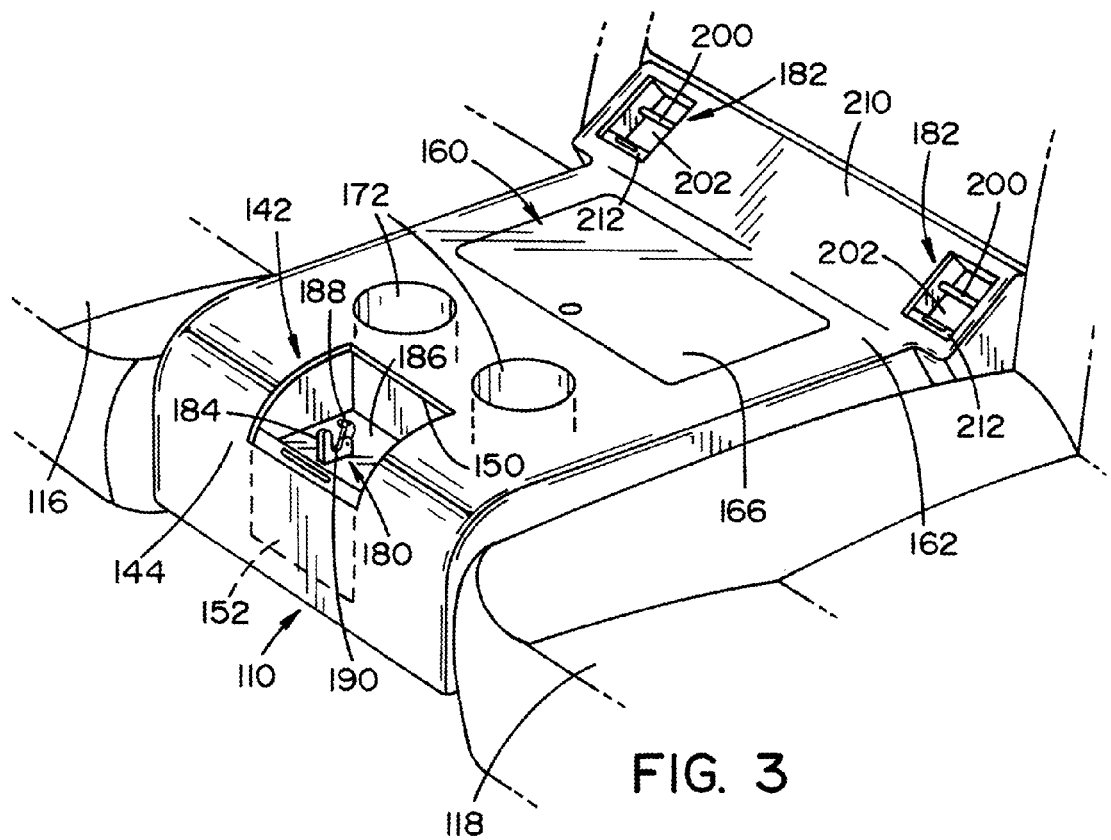
FIG. 3 is an enlarged schematic perspective view of the center console of the rear seat assembly of FIG. 1 according to one exemplary aspect of the present disclosure.

With reference to FIGS. 1 and 3, the exemplary center console 110 is positioned between the outboard seats 102,104 and is stationary with respect to the outboard seats. Associated with the center console 110 is a back member 140 which is positioned between the seatbacks 112,114 of the respective outboard seats 102,104. For a rear seat assembly having the seatback pivotally connected to the seat bases, the back member 140 can also be moved from an upright position shown in FIG. 1 to a stowed position where the back member is folded toward the center console 110. In the depicted exemplary embodiment, the center console 110 includes a storage compartment 142 disposed at a forward portion 144 of the center console. As shown in FIG. 3, the forward storage compartment 142 has an opening 150 which allows an associated object to be selectively placed within the storage compartment 142. A cover 152 moveably connected to the center console 110 is provided for the storage compartment 142. The cover 152 is slidable from a first position (FIG. 1) in which the cover overlays the opening 150 to a second position (FIG. 3) which provides access to the storage compartment 142. The center console 110 can also be provided with a second storage compartment 160 at a rearward portion 162 of the center console; although, this is not required. The second storage compartment 160 also has an opening (not shown) for selectively storing associated objects within the second storage compartment 160 and includes a cover 166 which is movable from a first position in which a cover overlays the opening to a second position which provides access to the second storage compartment. The center console 110 can also include at least one cup holder 172 located between the storage compartment 142 and the second storage compartment 160. As shown, a pair of cup holders are provided, one cup holder for each occupant of the outboard seats 102,104. It should also be appreciated that other storage features can be provided on the center console 110. For example, instead of the second storage compartment 160, the center console 110 can include an open compartment which spans laterally across the center console.

With continued reference to FIG. 3, the center console 110 includes a safety restraint system which allows a child safety restraint (i.e., child booster seat 220, a child safety seat 330 and an infant carrier 332) to be selectively secured to a top surface of the center console. The safety restraint system comprises a first child safety restraint attachment 180 provided at the forward portion 144 of the center console 110 and a pair of second child safety restraint attachments 182 is provided at the rearward portion 162 of the center console. In the depicted exemplary embodiment, the first child safety restraint attachment is a latch 184 located within the storage compartment 142. The latch 184 can be fixedly mounted to a bottom wall 186 of the storage compartment 142. The latch 184 includes a spring-loaded engagement member 188 and a receiving area 190. As will be discussed in greater detail below, the receiving area 190 receives a portion of an attachment member associated with the child safety restraint.

Each second attachment is a lower anchorage or anchor bar 200 located in a covered recess 202 provided in the reward portion 162 of the center console 110. In the depicted exemplary embodiment of the center console 110, the recesses 202 are located on a upwardly canted section 210 of the rearward portion 162; although, this is not required. The upwardly canted section 210 allows for ease of mounting of the child safety restraint to the center console. Each recess 202 includes a cover 212 which is movable from a first position in which the cover overlays the recess to a second position which provides access to the anchor bars 200 provided with the recesses 202. The anchor bars 200 can be secured to a support component (not shown) associated with the rear seat assembly 100.

Figure 2:
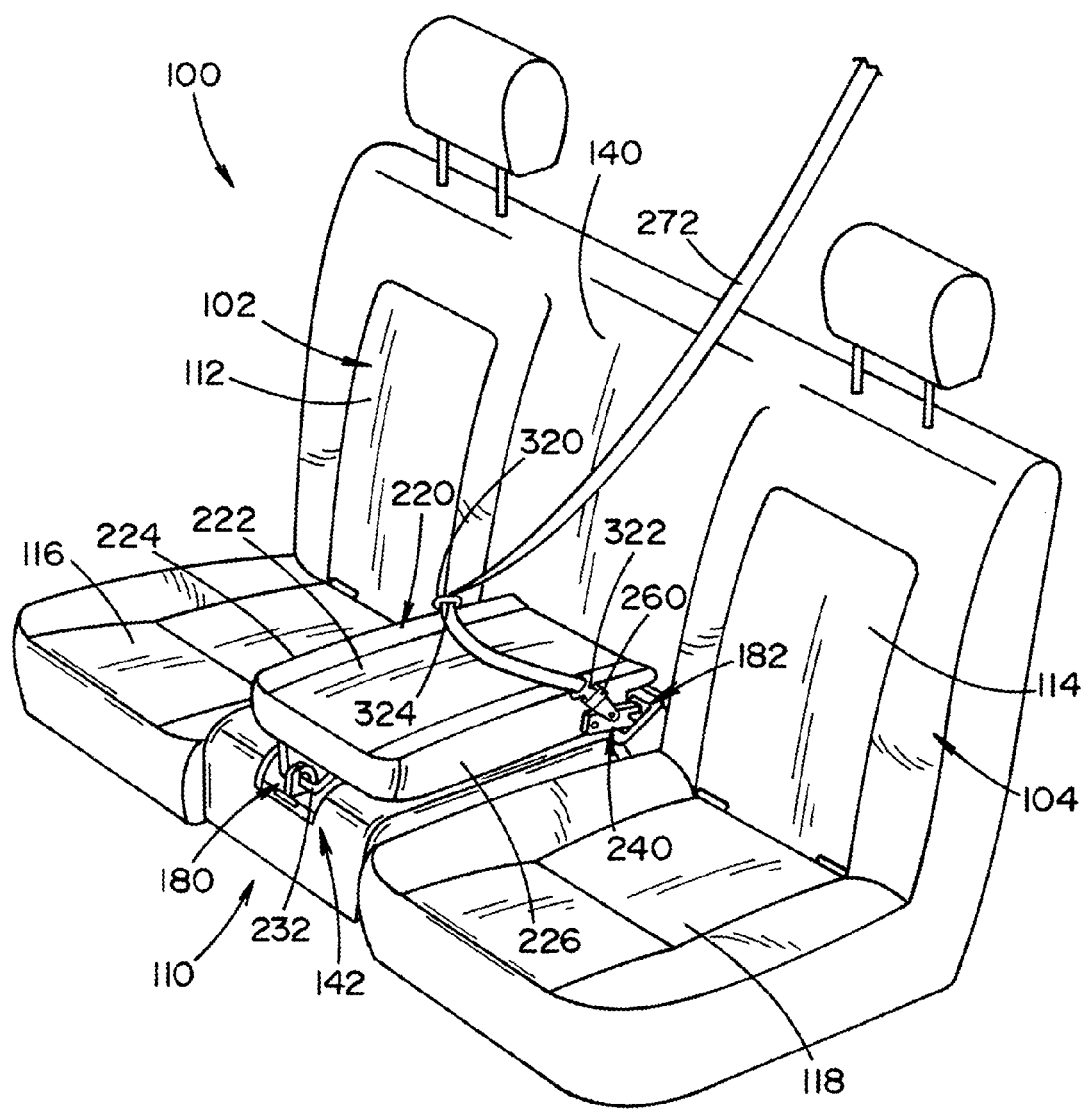
FIG. 2 is a schematic perspective view of the rear seat assembly of FIG. 1 having a child safety restraint, such as a booster seat, secured to a center console of the rear seat assembly.
Figure 4:
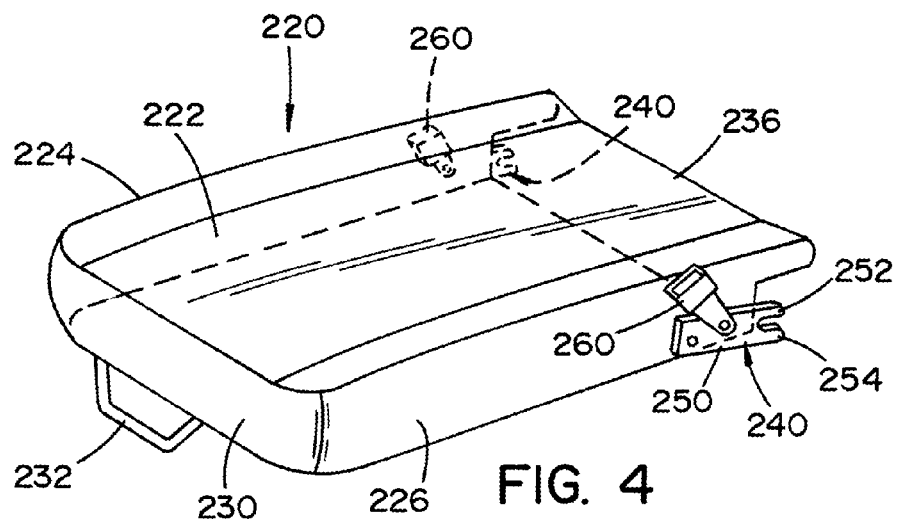
FIG. 4 is an enlarged schematic perspective view of the child safety restraint of FIG. 2.

With reference to FIGS. 2 and 4, according to one aspect of the present disclosure, the child safety restraint is a child booster seat 220. The child booster seat 220 includes a seat base or cushion 222 which is dimensioned so that outboard sides 224,226 of the cushion 222 do not project over inboard sides of the outboard seats 102,104. Located at a forward portion 230 of the child booster seat 220 is a forward attachment member or striker 232. Located at a rearward portion 236 of the child booster seat 220 are a pair of rear attachment members 240. The forward striker 232 is configured to be engaged by the first attachment 180. Particularly, to secure the forward striker to the latch 184, the forward striker 232 is positioned within the receiving area 190 and the arm 188 is moved over the forward striker. A release mechanism (not shown) can be provided within the storage compartment 142 for releasing the forward striker from the latch. The rear attachment members 240 are provided on the outboard sides 224,226 of the child booster seat 220. Each rear attachment member 240 includes an arm 250 having a latching mechanism 252 provided on a rear end 254 of the arm. The latching mechanism 252 is configured to engage the anchor bar 200 provided in the recess 202. The child booster seat 220 also includes integrated buckles 260 provided on the outboard sides 224,226. To mount the child booster seat 220 to the center console 110, the cover 152 of the storage compartment 142 is moved to the second position which provides access to the first attachment 180. The covers 212 are also moved to the second position to provide access to the second attachments 182. The rear attachments 240 are first engaged to the anchor bars 200 provided within the recesses 202 and the forward striker 232 is then engaged by the latch 184.

Figure 5:
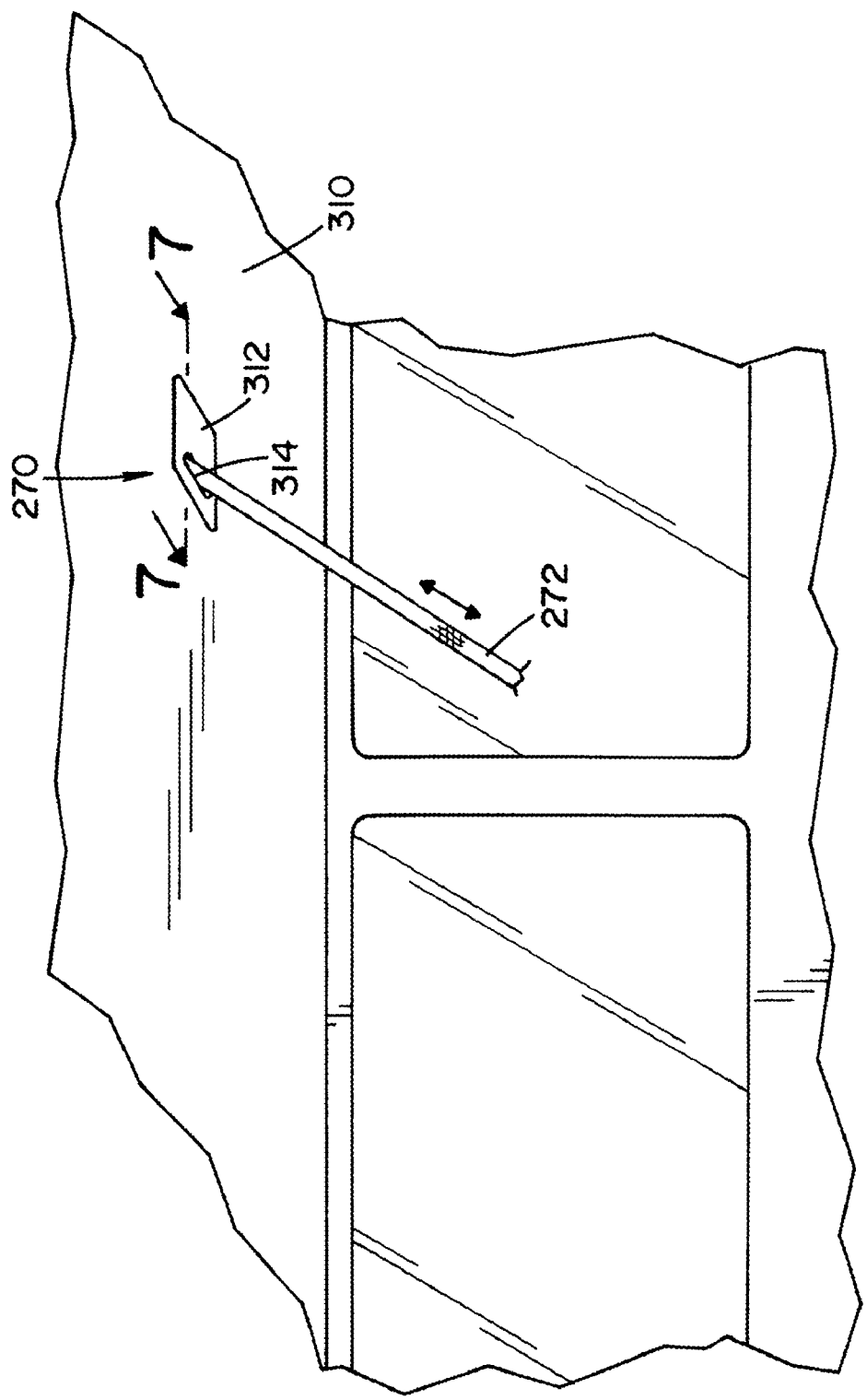
FIG. 5 is a partial schematic view of a seat beat assembly mounted to a roof structure of the vehicle for use with the child safety restraint shown in FIG. 2.

With reference to FIGS. 2, 5 and 7, the child safety restraint system for the exemplary rear seat assembly 100 can include a seatbelt assembly 270 for use with the child safety restraint (i.e., child booster seat 220) mounted on the center console 110. The seatbelt assembly 270 includes a seatbelt webbing 272 and a retractor 274 for winding up the seatbelt webbing. The retractor 274 is mounted on a roof support structure 280 of the vehicle and is positioned generally above the center console 110. In the depicted exemplary embodiment, the roof support structure 280 includes a support panel 282 which spans laterally across the vehicle. A stiffener 284 is secured to an underside of the support panel 282. A portion 286 of the stiffener 284 is configured for engagement with the retractor 274. In the depicted embodiment, the portion 286 of the stiffener 284 includes an arcuate section 288 which generally mirrors at least a portion of an outer contour of the retractor 274. According to one aspect, to secure the retractor 274 to the support structure 280, the retractor 274 includes a support plate 290, the opposed ends of which are mounted to the section 286 of the stiffener 284. Particularly, the portion 286 of the stiffener 284 includes mounting apertures 292,294. The support plate 290 includes openings 296,298 which register with the respective apertures 292,294 when the support plate is positioned against the stiffener portion 286. As shown, a fastener, such as a screw 300, extends through the opening 296 and threadenly engages the aperture 292. A nut 302, which is fixedly secured to the stiffener portion 286, is provided over the aperture 294. A fastener, such as a bolt 304, extends through the opening 298 and threadenly engages the nut 302. It should be appreciated that the above mounting is by way of example only and alternative manners for mounting the retractor 274 to the support structure 280 are contemplated. To at least partially conceal the roof mounted retractor 274, a roof lining 310 of the vehicle includes a garnish 312, which removably secured to the roof lining to provide access to the retractor. The garnish 312 includes an opening 314 through which the seatbelt webbing 272 can extend.

With continued reference to FIG. 2, first and second tongues 320, 322 are provided on the seatbelt webbing 272. The first tongue 310 can be releasably secured to the buckle 260 provided on outboard side 224 of the child booster seat 220. An elongated opening 324 is provided on the first tongue 320 and threadenly receives the seatbelt webbing 272. The second tongue 322 is provided at an end of the seatbelt webbing 272 and is releasably secured to the buckle 260 provided on outboard side 226 of the child booster seat 220.

Figure 6:
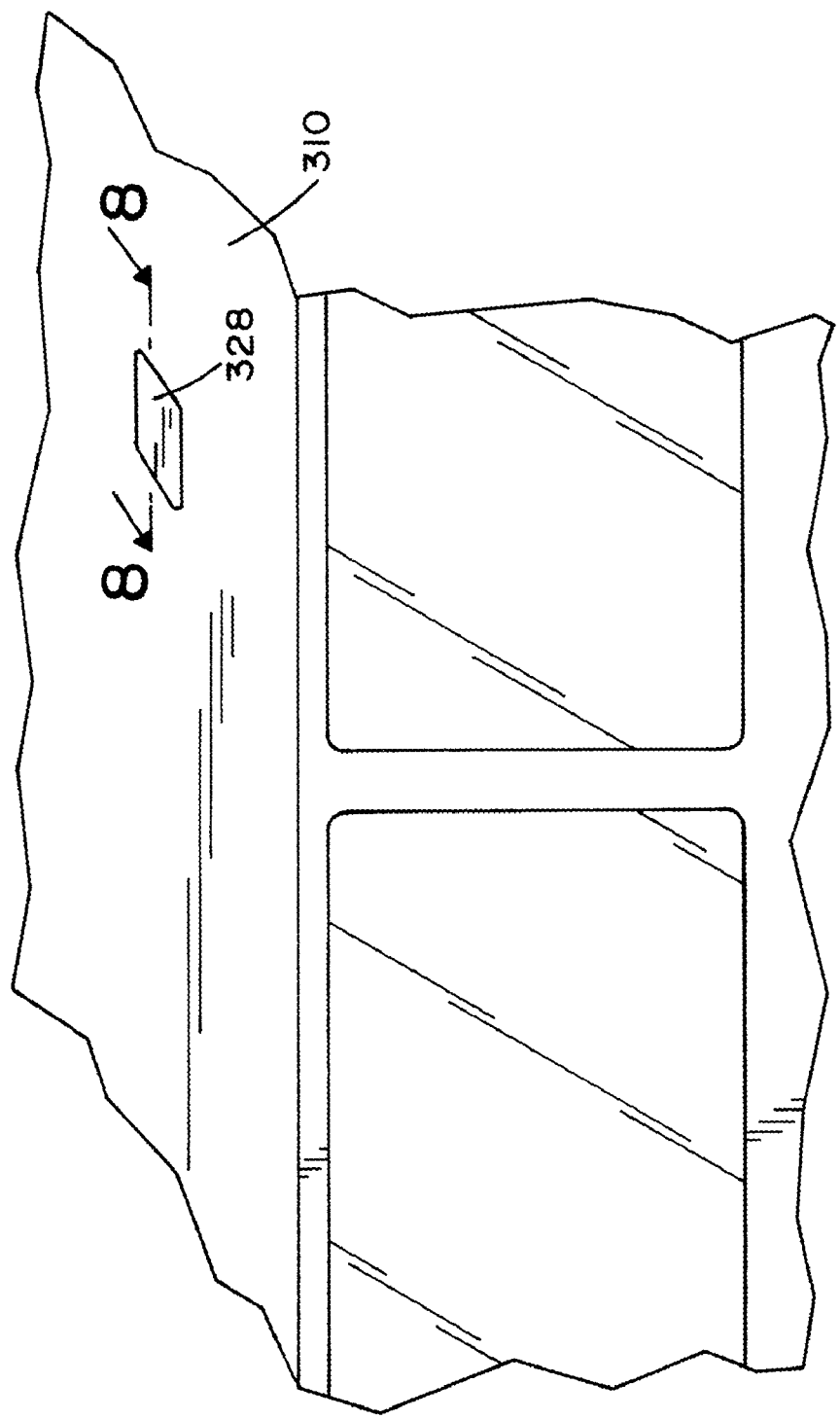
FIG. 6 is a partial schematic view of the roof structure of the vehicle without the seatbelt assembly.

As shown in FIG. 5, the seatbelt assembly 270 is located generally above the center console 210 as compared to seatbelt assemblies (not shown) associated with the outboard seats 102,104 of the rear seat assembly 100, which are at least partially mounted to left and right rear pillars (not shown) of the vehicle. It should be appreciated that a purchaser of the vehicle having the exemplary rear seat assembly 100 may decide not to have the seatbelt assembly 270 for use with the child safety restraint mounted on the roof support structure 280 of the vehicle. In that instance, and as shown in FIGS. 6 and 8, the roof support structure 280 can still be provided with the panel 282 and the stiffener 284 which is configured for attachment with the retractor 274. The roof lining 310 can include a garnish 328 that does not include an opening through which a seat beat webbing can be threaded. The portion 286 of the stiffener 284 can still be provided with the mounting means described above which allows the purchaser to subsequently install the seatbelt assembly 270 to the roof support structure 280.

Figure 9:
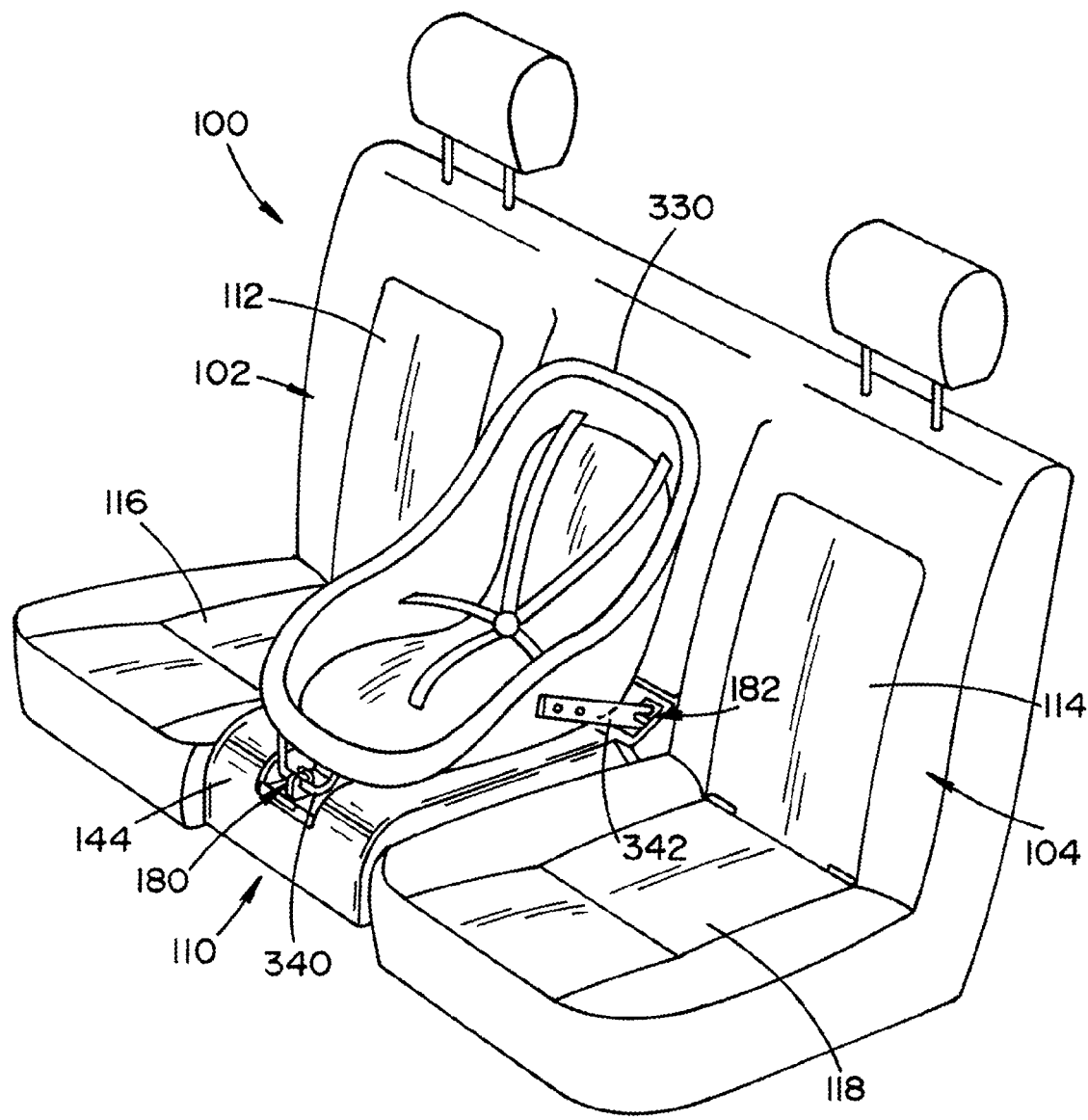
FIG. 9 is a schematic perspective view of the rear seat assembly of FIG. 1 having another child safety restraint, such as a child safety seat, mounted to the center console of FIG. 3.
Figure 10:
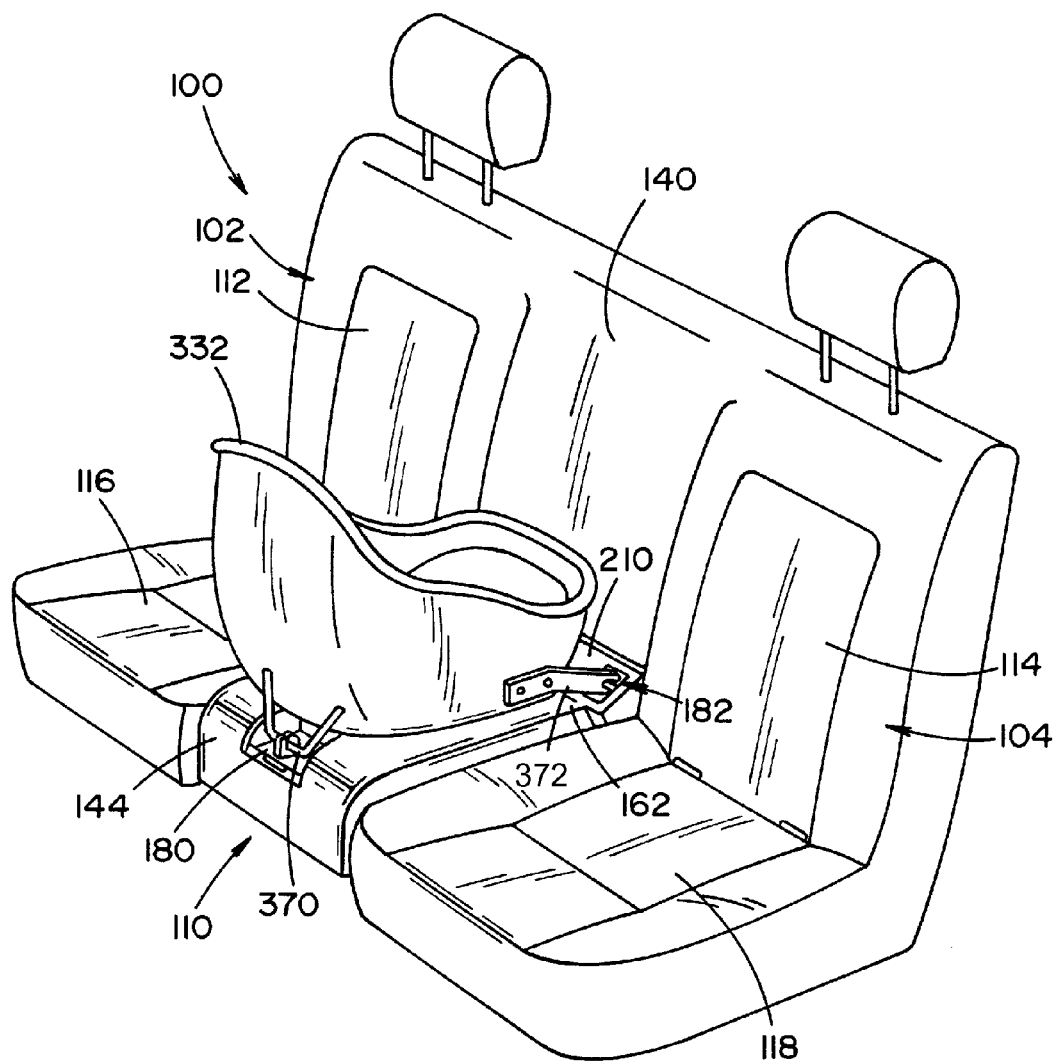
FIG. 10 is a schematic perspective view of the rear seat assembly of FIG. 1 having yet another child safety restraint, such as an infant carrier, mounted to the center console of FIG. 3.
Figure 11:
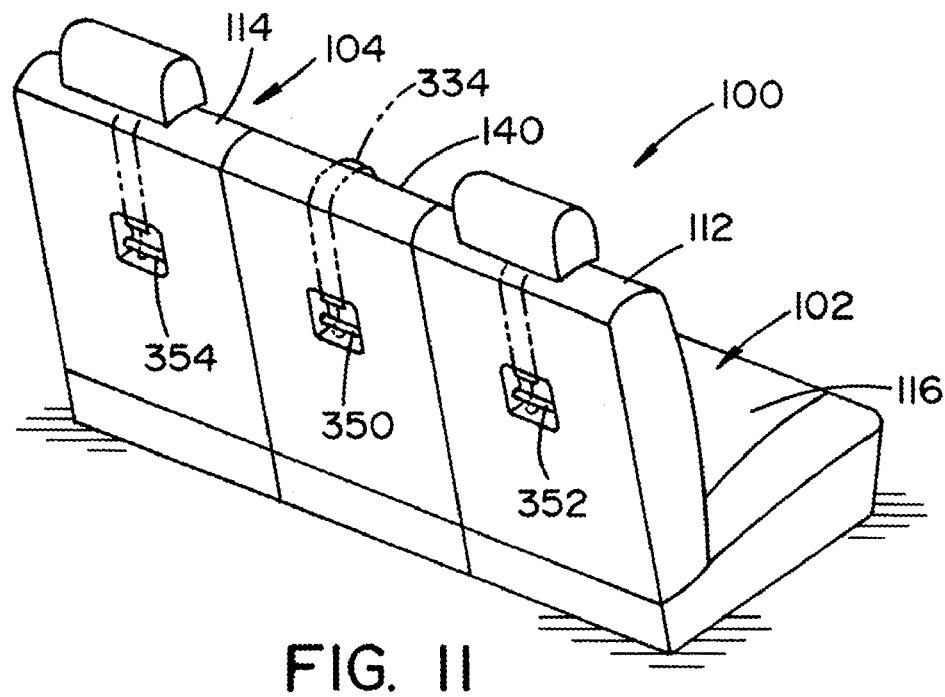
FIG. 11 is a schematic rear perspective view of seatbacks of respective outboard seats and the center console of the rear seat assembly of FIG. 1, each seatback being provided with a top tether anchorage for a child safety restraint.
Figure 12:
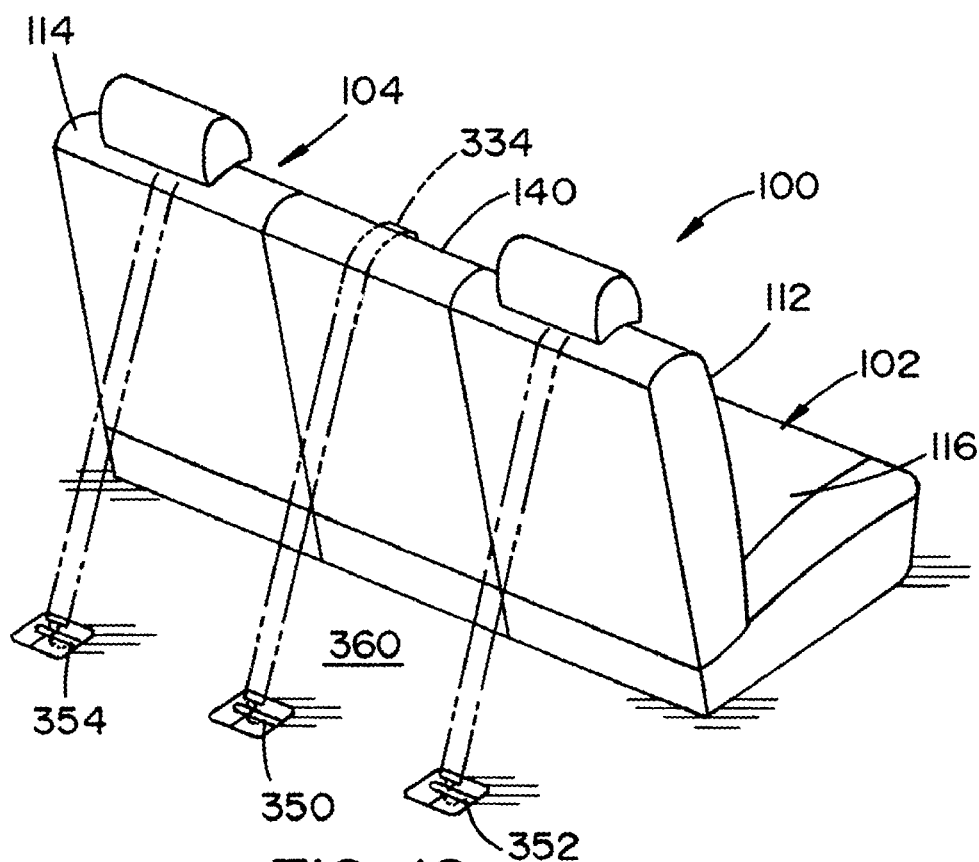
FIG. 12 is a schematic rear perspective view of the rear seat assembly of FIG. 1 showing top tether anchorages provided on a floor structure of the vehicle.

With reference to FIGS. 9 and 10, the exemplary center console 110 is configured for use with other child safety restraints such as a child safety seat 330 and an infant carrier 332. Similar to the child booster seat 220, the child safety seat 330 includes a forward striker 340 for engaging the first attachment 180 and a pair of rear attachment members 342 for engaging the pair of second attachments 182. Generally for installation of the child safety seat 330, a top tether anchorage is associated with the rear seat assembly 100 to which a top tether strap 334 (FIG. 11) of the child safety seat 330 is releasably attached. As shown in FIG. 11, according to one exemplary aspect, the top tether anchorage 350 is secured to the rear of the back member 140. Similar top tether anchorages 352, 354 can be secured to the rear of the respective seatbacks 112,114 of the outboard seats 102,104. The top tether anchorages 350,352,354 can include a ring, bar, bracket or webbing loop which is secured to an underlying support component associated with the rear seat assembly 100. As shown in FIG. 12, according to another aspect, the top tether anchorages 350,352,354 are provided on a floor 360 of the vehicle. With reference again to FIG. 10, the infant carrier 332 includes a forward striker 370 for engaging the first attachment 180 and a pair of rear attachment members 372 for engaging the pair of second attachments 182 The mounting of the child safety seat 330 and the infant carrier 332 to the center console 110 is similar to the mounting of the child booster seat 220 to the center console. In each instance, the second attachment members of the child safety restraint are first engaged to the rear attachments 182 and then the forward striker of each child safety restraint is engaged to the first attachment 180.

Figure 13:
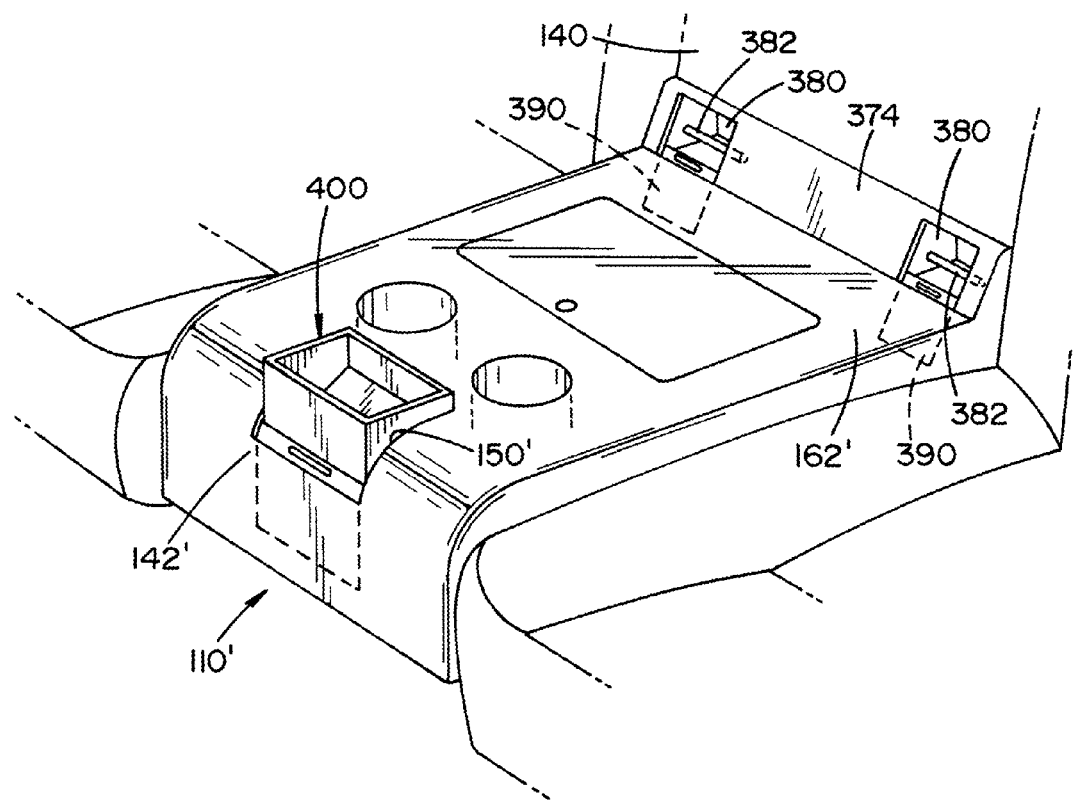
FIG. 13 is an enlarged schematic perspective view of a center console of the rear seat assembly of FIG. 1 according to another exemplary aspect of the present disclosure.

As indicated previously, the rearward portion 162 of the center console 110 includes the canted section 210 which allows for ease of engagement of the rear attachment members 240,342,372 of the respective child safety restraints 220, 330,332 to the center console 110. In lieu of the canted section, and as shown in FIG. 13, an alternate exemplary embodiment of the center console 110' can include a back section 374 located at the rearward portion 162' of the center console. The back section 374 forms a lower portion of the back member 140, and includes recesses 380 for receiving anchor bars 382. Covers 390 are provided for each recess 380 for hiding the anchor bars 382 in a non-use condition. As is also shown, the center console 110' can include a removable tray 400 which is dimensioned to be received within the opening 150' of the storage compartment 142'. The removable tray conceals the first attachment 180 in a non-use condition and also allows for storage of additional associated objects.

As evident from the foregoing, the exemplary center console 110 of the rear seat assembly 100 is provided with mounting locations for attaching a child safety restraint 220, 330,332 to the center console. The center console 110 has integrated anchor bars 200 at a rearward portion 162 of the center console and a latch 184 integrated with a forward portion 144 of the center console. Doors or covers 152,212 are provided for concealing the respective latch 184 and the anchor bars 200 in a non-use position. A removable tray 400 can be provided in the latch storage area 142 for additional storage when the child safety restraint is not installed on the center console 110. The seatbelt assembly 270 can be provided for the child safety restraint system. The roof mounted retractor 274 is included at a center location on the support component 280 associated with the vehicle roof. The retractor is hidden from the operator via the garnish 312 provided on the roof lining 310. The roof mounted retractor 274 can be dealer installed as a separate accessory with torque control to guarantee operator safety. The separate seatbelt assembly 270 would be provided on the vehicle for users who intend to install the child booster seat 220 to the center console 110. For users who intend only to install the child seat 330 and infant carrier 332 to the center console 110, the seatbelt assembly 270 would be removable with the closeout garnish 328 covering the attachment area in the vehicle roof to maintain a clean appearance. The top tether anchorages 350,352,354 can be provided on one of the seatbacks and the vehicle floor for use with the child safety restraints.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle rear seat assembly having a child safety restraint system comprising:
a pair of outboard seats;
a center console positioned between the outboard seats and stationary with respect to the outboard seats, the console including a storage compartment disposed at a forward portion of the console and having an opening which allows an associated object to be selectively placed within the storage compartment and a pair of spaced apart recesses separate from and not defined by the storage compartment and disposed at a rear portion of the console;
a first child safety restraint attachment located within the storage compartment, and a pair of second child safety restraint attachments, each second attachment being located in one of the recesses, wherein the first attachment and the pair of second attachments allow a child safety restraint to be selectively secured to the center console;
wherein the storage compartment includes a cover which is movable from a first position in which the cover overlays the opening to a second position which provides access to the first attachment.

2. The rear seat assembly of claim 1, wherein the first attachment is a latch.

3. The rear seat assembly of claim 1, wherein each of the second attachments is a lower anchorage.

4. The rear seat assembly of claim 1, wherein the center console further includes a pair of covers associated with the pair of recesses, each cover being movable from a first position in which each cover overlays one of the recesses to a second position which provides access to one of the second attachments.

5. The rear seat assembly of claim 1, wherein the child safety restraint is one of an infant carrier, a child safety seat and a child booster seat, the child safety restraint including a forward striker for engaging the first attachment and a pair of rear attachment members for engaging the pair of second attachments.

6. The rear seat assembly of claim 1 in combination with a seatbelt assembly for use with the child safety restraint, the seatbelt assembly including a seatbelt webbing and a retractor for winding up the seatbelt webbing, the retractor being mounted on a roof support structure of the vehicle, a roof lining of the vehicle including a garnish for at least partially covering the roof mounted retractor.

7. The rear seat assembly of claim 1, further including a back member associated with the center console and positioned between the seatbacks of the outboard seats, the back member including a top tether anchorage for use with the child safety restraint.

8. A vehicle rear seat assembly having a center child safety restraint system comprising:
a pair of outboard seats, each of the outboard seats having a seatback and a seat base; and
a center console positioned between the outboard seats and stationary with respect to the outboard seats, the center console including a first child safety restraint attachment located at a forward portion of the center console and a pair of second child safety restraint attachments located at a rear portion of the center console, the first attachment and the pair of second attachments being configured to allow a child safety restraint to be selectively secured to a top surface of the center console, the center console being configured to conceal the first attachment and the pair of second attachments in a non-use condition, wherein the center console includes a storage compartment, the pair of second child safety restraint attachments being spaced from and positioned outside of the storage compartment.

9. The rear seat assembly of claim 8, wherein the first attachment is a latch disposed within the storage compartment.

10. The rear seat assembly of claim 8, further including a cover connected to the center console and movable between a closed position and an open position for providing access to the storage compartment and the first attachment.

11. The rear seat assembly of claim 9, further including a removable tray dimensioned to be received within the opening of the storage compartment, the tray hiding the first attachment in a non-use condition.

12. The rear seat assembly of claim 8, wherein the center console includes a pair of recesses, each of the second attachments being a lower anchorage disposed within one of the recesses.

13. The rear seat assembly of claim 12, wherein the center console further includes a pair of covers associated with the pair of recesses, each cover being movable between a closed position and an open position for providing access to one of the second attachments.

14. The rear seat assembly of claim 8, further including a back member associated with the center console and positioned between the seatbacks of the outboard seats, the back member being movable between an upright, stowed position and a folded position where the back member is folded toward the center console, the back member having a top tether anchorage for use with the child safety restraint.

15. The rear seat assembly of claim 8, further including a seatbelt assembly for use with the child safety restraint, the seatbelt assembly having a seatbelt webbing and a retractor for winding up the seatbelt webbing, the retractor being mounted on a roof support structure of the vehicle, a roof lining of the vehicle including a garnish for at least partially covering the roof mounted retractor.

16. A vehicle rear seat assembly having a center child safety restraint system comprising:
a pair of outboard seats, each of the outboard seats having a seatback and a seat base, the seatback capable of pivoting between a stowed position where the seatback is folded toward the seat base and an upright, seat position;
a center console positioned between the outboard seats and stationary with respect to the outboard seats, the center console including an interior storage compartment located at a forward portion of the console and a pair of recesses located at a rear portion of the console, a first child safety restraint attachment is disposed within the storage compartment and a pair of second child safety restraint attachments is disposed within the pair of recesses, the first attachment and the pair of second attachments allowing a child safety restraint to be selectively secured to the console, the center console further including a cover associated with the storage compartment and slidable between a closed position and an open position for providing access to the storage compartment and the first attachment, and a pair of covers associated with the pair of recesses and slidable between a closed position and an open position for providing access to the second attachments; and
a seatbelt assembly for use with the child safety restraint, the seatbelt assembly having a seatbelt webbing and a retractor for winding up the seatbelt webbing, the retractor being mounted on a roof support structure of the vehicle, a roof lining of the vehicle including a garnish for at least partially covering the roof mounted retractor.

17. The rear seat assembly of claim 16, wherein the first attachment is a latch and each of the second attachments is a lower anchorage.

18. The rear seat assembly of claim 16, further including a back member associated with the center console and positioned between the seatbacks of the outboard seats, the back member having a top tether anchorage for use with the child safety restraint.

* * * * *